United States Patent
Brees

(10) Patent No.: US 8,141,354 B2
(45) Date of Patent: Mar. 27, 2012

(54) TORQUE CONVERTER WITH STATOR SHAFT ONE-WAY CLUTCH

(75) Inventor: William Brees, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 705 days.

(21) Appl. No.: 12/229,644

(22) Filed: Aug. 26, 2008

(65) Prior Publication Data
US 2009/0065319 A1 Mar. 12, 2009

Related U.S. Application Data

(60) Provisional application No. 60/966,744, filed on Aug. 29, 2007.

(51) Int. Cl.
*F16H 41/24* (2006.01)
*F16H 41/30* (2006.01)

(52) U.S. Cl. .......................................................... 60/345

(58) Field of Classification Search ................. 60/341, 60/345, 346
See application file for complete search history.

(56) References Cited

U.S. PATENT DOCUMENTS

| 6,325,191 | B1 | 12/2001 | Meisner et al. |
| 6,543,592 | B2 * | 4/2003 | Hori ................................ 192/45 |
| 6,615,962 | B2 | 9/2003 | Back et al. |
| 7,036,643 | B2 | 5/2006 | Back et al. |

FOREIGN PATENT DOCUMENTS

JP 2006138429 A * 6/2006

* cited by examiner

*Primary Examiner* — Thomas E Lazo
(74) *Attorney, Agent, or Firm* — Davidson, Davidson & Kappel, LLC

(57) ABSTRACT

A hydraulic torque converter including a stator, a stator shaft, a one-way clutch including blocking elements and being connected to the stator shaft, a stator hub connecting the stator to the one-way clutch, and axial bearings supporting the stator hub, an axial length of the blocking elements being larger than an axial length between the bearings. Embodiments with blocking elements in a pump hub with an inner race with a radius similar to the stator shaft and with adjacent blocking elements are also disclosed.

8 Claims, 3 Drawing Sheets

TORQUE CONVERTER WITH STATOR SHAFT ONE-WAY CLUTCH

Priority to U.S. Provisional Patent Application Ser. No. 60/966,744, filed Aug. 29, 2007, is claimed, the entire disclosure of which is hereby incorporated by reference herein.

The present invention relates generally to torque converters, and more particularly to torque converters having one-way clutches.

BACKGROUND OF THE INVENTION

U.S. Pat. Nos. 6,325,191, 6,615,962, and 7,036,643 are hereby incorporated by reference herein and disclose hydraulic torque converters with one-way clutches.

FIG. 1 shows a prior art hydraulic torque converter 10 including a housing 11 and a pilot 12 coupled with and driven by a prime mover, such as a combustion engine or a crankshaft. Housing 11 has coaxial shells 14 and 16 secured and sealed together, e.g., welded. Attached to housing 11 is a pump 18 coaxial with and sharing the angular motion of housing 11.

Enclosed in housing 11 are a turbine 20 rotatable with respect to housing 11 and a stator 22 installed between pump 18 and turbine 20. Turbine 20 is non-rotatably connected to a turbine hub 24, and turbine hub 24 is non-rotatably connected to element 26, e.g., a transmission input shaft, by splines 28. Stator 22 is mounted on a one-way clutch 30 connected by splines 32 to a hollow, non-rotating stator shaft 34. Axial bearings 36 and 38 are provided at sides of a stator hub 40 and a side plate 42.

One-way clutch 30 includes an outer race 33, blocking elements 35 such as rollers or sprags or individual struts to resist rotation in one direction, and an inner race 31 supporting the blocking elements. Inner race 31 is connected by splines 32 to stator shaft 34. One-way clutch 30 allows stator to only rotate in the same direction that housing 11 rotates around stator shaft 34. Stator shaft 34 may be fixed to a transmission housing.

Torque converter 10 further includes a bypass clutch 44 capable of being engaged to transmit torque directly between housing 11 and turbine hub 24. This is accomplished with a piston 46 which can be moved axially within the housing 11 in order to position a friction surface 48 of piston 46 in contact with a confronting friction surface 50 of housing 11. A torsional vibration damper 52 is installed within the torque path of the bypass clutch 44, between housing 11 and turbine hub 24.

SUMMARY OF THE INVENTION

The present invention provides a hydraulic torque converter comprising a stator, a stator shaft, a one-way clutch including blocking elements and being connected to the stator shaft, a stator hub connecting the stator to the one-way clutch, and axial bearings supporting the stator hub, an axial length of the blocking elements being larger than an axial length between the bearings.

The present invention also provides a hydraulic torque converter comprising a housing having a pump hub, a stator, a stator shaft located partially within the pump hub, a one-way clutch including blocking elements and being connected to the stator shaft, a stator hub connecting the stator to the one-way clutch, the blocking elements being located at least partially inside the pump hub.

The present invention also provides a hydraulic torque converter comprising a stator, a stator shaft having a shaft outer radius, and a one-way clutch including an inner race and blocking elements supported on the inner race, the inner race having a radius similar to the shaft outer radius, and an outer race on the blocking elements connected to the stator in a rotationally-fixed manner.

The present invention also provides a hydraulic torque converter comprising a stator, a shaft, and a one-way clutch connecting the stator and the stator shaft and including blocking elements, the blocking elements being adjacent in a circumferential direction.

DETAILED DESCRIPTION

Figure 1:
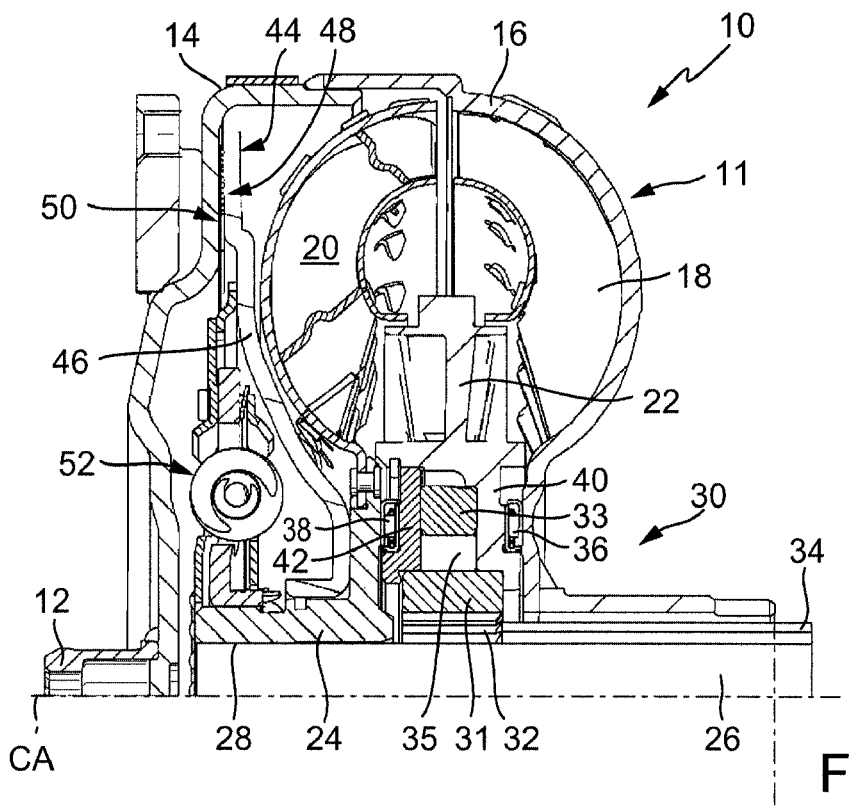
FIG. 1 is a sectional view of a prior art hydraulic torque converter.
Figure 2:
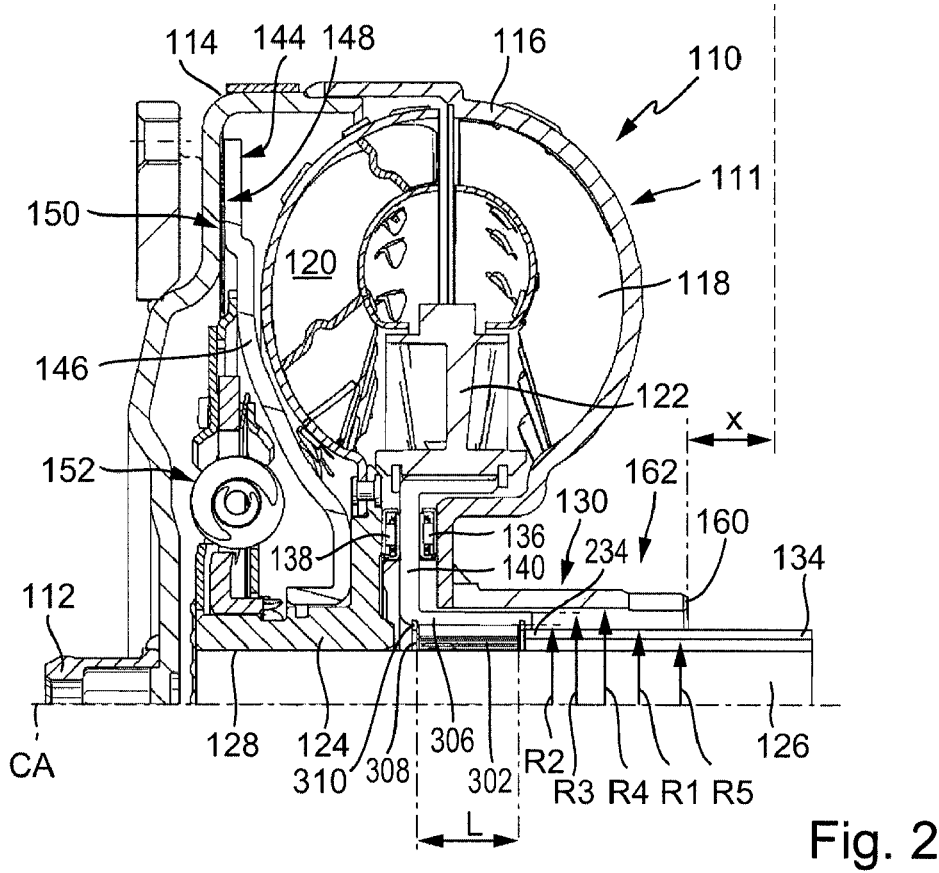
FIG. 2 is a sectional view of a hydraulic torque converter in accordance with an embodiment of the present invention.

FIG. 2 shows a hydraulic torque converter 110 embodying the present invention. Torque converter 110 includes a housing 111 and a pilot 112 coupled with and driven by a prime mover, such as a combustion engine or a crankshaft. Housing 111 has coaxial shells 114 and 116 secured and sealed together, e.g., welded. Attached to housing 111 is a pump 118 coaxial with and sharing the angular motion of housing 111. Coaxial shell 116 of housing 111 has a pump hub 162 having an end 160 and inner radius R4. Pump hub 162 is a tubular structure extending from the pump side of housing 111.

Enclosed in housing 111 are a turbine 120 rotatable with respect to housing 111 and a stator 122 installed between pump 118 and turbine 120. Turbine 120 is non-rotatably connected to a turbine hub 124, and turbine hub 124 is non-rotatably connected to element 126, e.g., a transmission input shaft, by splines 128. Stator 122 is mounted on a one-way clutch 130 via a stator hub 140 splined to stator 122. Axial bearings 136 and 138 are positioned adjacent to stator hub 140, and are separated by an axial distance L2, which also defines the width of stator hub 140 between axial bearings 136, 138.

One-way clutch 130 has an inner race 234, blocking elements 302, and an outer race 306. Outer race 306 is an inner tubular section integrally connected to stator hub 140. Outer race 306 thus defines a clutch housing with inner radius R2 and outer radius R3. Blocking elements 302 have an axial length L and are axially retained by a washer 308 and a snap ring 310. Inner race 234 is integral with shaft 134, and may not have a same radius R1.

Torque converter 110 further includes a bypass clutch 144 capable of being engaged to transmit torque directly between housing 111 and turbine hub 124. This is accomplished with a piston 146 which can be moved axially within housing 111 in order to position a friction surface 148 of piston 146 in contact with a confronting friction surface 150 of housing 111. A torsional vibration damper 152 is installed within the torque path of bypass clutch 144, between housing 111 and turbine hub 124.

Figure 3:
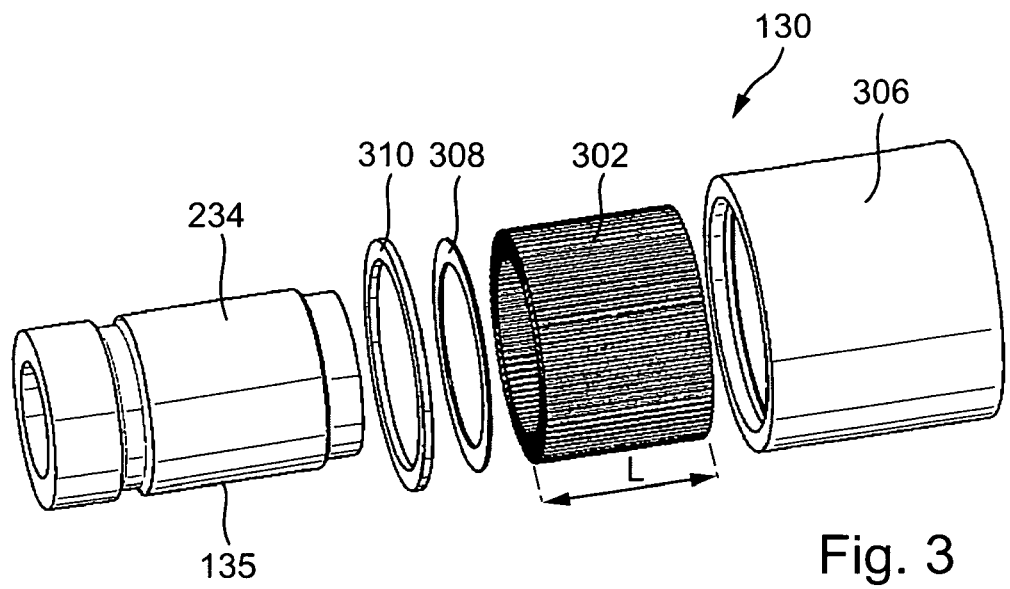
FIG. 3 is an exploded view of one embodiment of a one-way clutch shown in FIG. 2.

As shown in more detail in FIG. 3, one-way clutch 130 includes a packed, annular configuration of blocking elements 302, for example radially short and axially long strips made of, for example, steel (the individual strips are shown together for clarity, even though the strips are separate pieces). Alternately, the blocking elements 302 could be provided in a two-part cage. One-way clutch 130 also includes a section of shaft 134 having a blocking element support surface 135, clutch housing 306, washer 308, and snap ring 310. Clutch housing 306 is an inner tubular portion integral with stator hub 140 in torque converter 110, as shown in FIG. 2.

Figure 4:
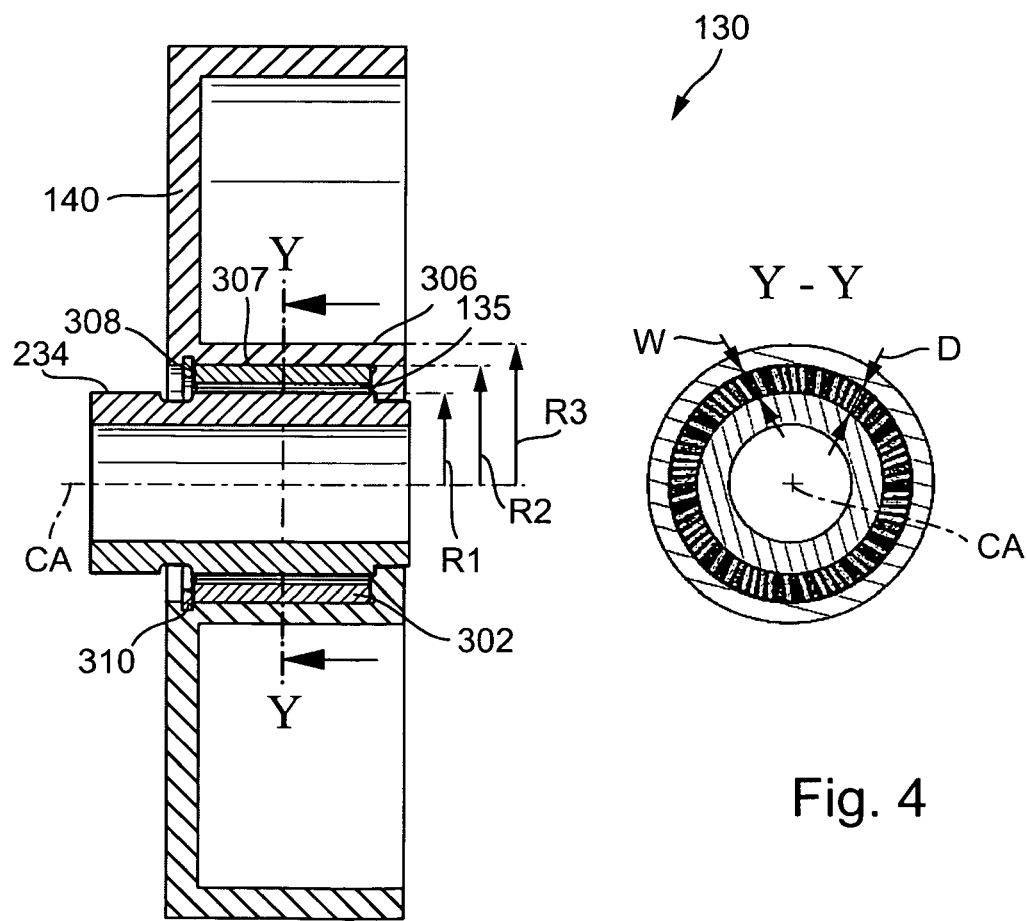
FIG. 4 shows a cross-sectional view of the one-way clutch of FIG. 3.

As shown in FIG. 4, clutch housing 306 is coaxial with shaft 134, and strips of steel 302 are positioned between support surface 135 of section 234 and inner surface 307 of clutch housing 306 at an angle to a radial line from center axis CA. Because width W of each steel strip 302 is greater than the radial distance D between support surface 135 and clutch housing 306, clutch housing 306 can rotate in only one direction around shaft 134. When housing 306 is rotated such that friction would tend to align strips 302 with the radial direction, strips 302 become wedged due to friction, thereby preventing further rotation. When housing 306 is rotated in the opposite direction, strips 302 do not become wedged and therefore do not oppose rotation. Due to gravity, strips 302 on top of shaft 134 will always contact shaft 134 and clutch housing 306; this ensures that the friction forces necessary to wedge strips 302 will always be available. Also, because strips 302 are packed together, as strips 302 on the top of shaft 134 begin to wedge, the remaining strips 302 will follow suit.

Figure 5:
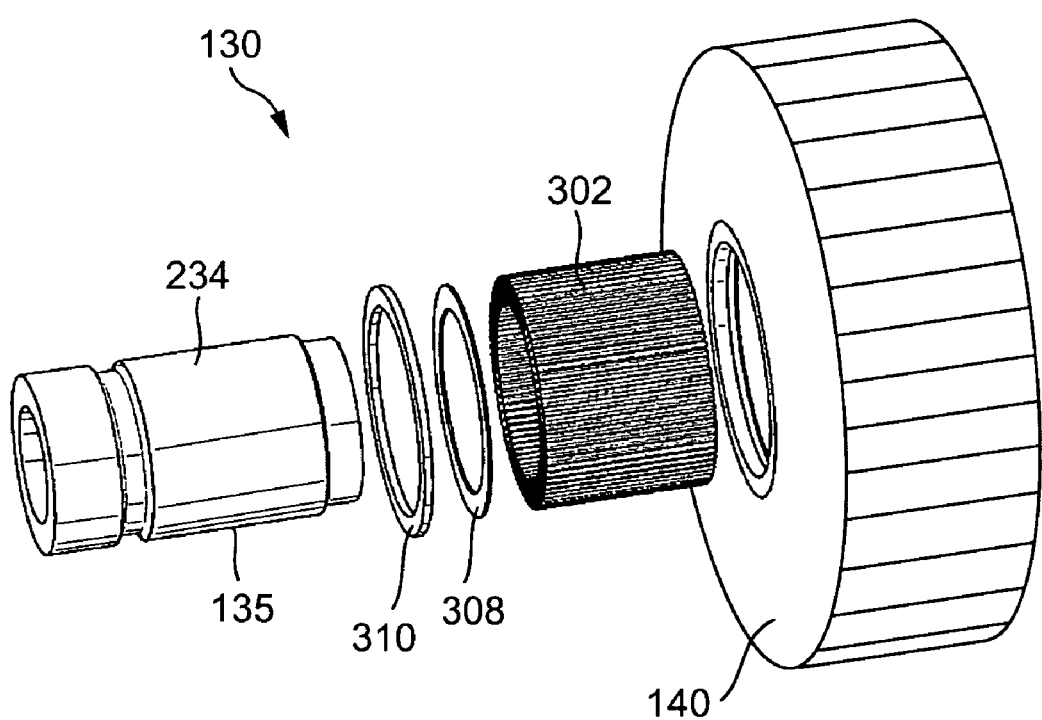
FIG. 5 is a similar view to FIG. 3 with the entire stator hub shown.

FIG. 5 shows the same view as FIG. 3, but with stator hub 140 fully shown. Stator hub 140 is splined to rotate with stator 122.

By providing one-way clutch 130 with blocking element support surface 135 having similar or equal radius R1 to the radius R5 of stator shaft 134 outside of clutch housing 306, one-way clutch 130 can be positioned radially closer to the center axis CA, compared to prior art clutches. Advantageously, one-way clutch housing 306 thus can fit within pump hub 162, blocking elements 302 can sit directly on shaft support surface 135, and axial length L of blocking elements 302 can be extended, thereby reducing contact pressure. The overall axial length of torque converter 110 can thus be shortened by a distance X, and bearings 136, 138 can be located close to one another so that axial distance L2 is less than the blocking element length L. A more compact design results. Due to extra axial length of one-way clutch 130, blocking function can be improved and wear can be reduced.

Blocking function is also advantageously improved by packing strips 302 close together, as shown in FIG. 3, to be adjacent. Compared to the prior art, where blocking elements 35 are typically separated by springs, the packed configuration increases the contact area between blocking elements 302 and adjacent surfaces 135 and 307. The increased contact area allows the radius of one-way clutch 130 to be reduced while maintaining torque capacity. "Adjacent" as used herein means in contact or capable of moving to contact one another.

Pump bearing 136 advantageously can be located within same axial location as the one-way clutch 130, or even axially closer to pilot 112 than the one-way clutch.

Alternate to strips 302, blocking elements can include other types of blocking elements, including sprags. Sprags may be extruded and strips 302 may be stamped.

As an alternative to the FIG. 2 embodiment, pump bearing 136 could be located axially beyond the clutch 130 in a direction away from the prime mover, and the turbine bearing 138 could be moved over clutch 130. The C-shape combination of stator hub 140 and clutch housing 306 could be inverted or made I-shaped, thus providing more space for bypass clutch 144.

Pump bearing 136 and turbine bearing 138 also may be encased in seals for the hydraulic fluid.

What is claimed is:

1. A hydraulic torque converter comprising:
 a stator;
 a stator shaft;
 a one-way clutch including blocking elements and being connected to the stator shaft;
 a stator hub connecting the stator to the one-way clutch; and
 axial bearings supporting the stator hub;
 an axial length of the blocking elements being larger than an axial length between the bearings, the blocking elements being strips.

2. The hydraulic torque converter as recited in claim 1 wherein the blocking elements are located radially inside the axial bearings.

3. The hydraulic torque converter as recited in claim 1 wherein the one-way clutch includes an inner race having a similar radius to the stator shaft.

4. The hydraulic torque converter as recited in claim 1 wherein the one-way clutch includes a clutch housing radially outside the blocking elements.

5. The hydraulic torque converter as recited in claim 1 wherein the one-way clutch has a clutch housing having an inner radius and an inner race having an outer radius, the distance between the inner radius and the outer radius being less than a width of the strips.

6. The hydraulic torque converter as recited in claim 1 further comprising a housing including a pump hub surrounding the stator shaft and at least partially surrounding the blocking elements.

7. The hydraulic torque converter as recited in claim 1 further comprising a housing, the stator shaft extending beyond the housing and wherein one-way clutch has an inner race supporting the blocking elements and having a radius similar to a radius of the stator shaft outside of the housing.

8. A hydraulic torque converter comprising:
 a housing having a pump hub;
 a stator;
 a stator shaft located partially within the pump hub;
 a one-way clutch including blocking elements and being connected to the stator shaft; and
 a stator hub connecting the stator to the one-way clutch;
 the blocking elements being located at least partially inside the pump hub.

* * * * *